US010956959B2

(12) United States Patent
Celorio-Martinez et al.

(10) Patent No.: US 10,956,959 B2
(45) Date of Patent: Mar. 23, 2021

(54) METHOD AND SYSTEM FOR DYNAMIC LINKING OF OFFERS TO TRANSACTION ACCOUNTS

(71) Applicant: Mastercard International Incorporated, Purchase, NY (US)

(72) Inventors: Jose-Luis Celorio-Martinez, New York, NY (US); Sheila Narayanan, Ardsley, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 189 days.

(21) Appl. No.: 15/865,812

(22) Filed: Jan. 9, 2018

(65) Prior Publication Data
US 2018/0144391 A1    May 24, 2018

Related U.S. Application Data

(63) Continuation of application No. 14/744,696, filed on Jun. 19, 2015, now Pat. No. 9,892,448.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0207* (2013.01)

(58) Field of Classification Search
CPC ........... G06Q 30/0631; G06Q 30/0207; G06Q 30/087
(Continued)

(56) References Cited

U.S. PATENT DOCUMENTS

2002/0133401 A1 * 9/2002 Mount ............... G06Q 30/02
 705/14.36
2005/0049964 A1 * 3/2005 Winterer ............... G06Q 20/10
 705/39
(Continued)

FOREIGN PATENT DOCUMENTS

CN 102136114 A 7/2011
CN 104572299 A 4/2015
(Continued)

OTHER PUBLICATIONS

Extended European Search Report dated Oct. 25, 2018, by the European Patent Office in corresponding European Patent Application No. 16812111.9-1217. (9 pages).
(Continued)

*Primary Examiner* — Rokib Masud
(74) *Attorney, Agent, or Firm* — Buchanan Ingersoll & Rooney PC

(57) ABSTRACT

A method for linking a transaction account to an offer includes: storing a plurality of account profiles, each profile including data related to a transaction account including an account identifier; receiving offer data from an entity, the data including data related to an offer for the purchase of goods or services; storing an offer data entry, the data entry including the offer data; generating an offer identifier associated with the offer data; transmitting the offer identifier to the entity; receiving an offer acceptance notification, the notification including a specific account identifier and the offer identifier; identifying a specific account profile that includes the specific account identifier; and updating at least one of the specific account profile and the offer data entry to indicate a linkage of the related transaction account to the offer data.

18 Claims, 9 Drawing Sheets

(58) Field of Classification Search
USPC .......................................... 705/21, 26, 26.7
See application file for complete search history.

(56) References Cited

U.S. PATENT DOCUMENTS

| | | | |
|---|---|---|---|
| 2007/0150369 A1* | 6/2007 | Zivin | ................. G06Q 30/0631 |
| | | | 705/26.64 |
| 2013/0041742 A1 | 2/2013 | Zhang et al. | |
| 2014/0249968 A1 | 9/2014 | MacKinnon | |

FOREIGN PATENT DOCUMENTS

| | | |
|---|---|---|
| EP | 2 487 875 A2 | 8/2012 |
| WO | WO 01/04779 A2 | 1/2001 |
| WO | 2012/083359 A2 | 6/2012 |
| WO | WO 2013/040591 A2 | 3/2013 |

OTHER PUBLICATIONS

International Search Report and Written Opinion issued by the International Search Authority on Aug. 30, 2016 in corresponding PCT Application No. PCT/US2015/064406 (11 pages).
Office Action (First Examination Report) dated Jul. 23, 2020, by the Intellectual Property India in corresponding India Patent Application No. 201717043316 and an English Translation of the Office Action. (7 pages).
Office Action (First Office Action) dated Nov. 11, 2020, by the China National Intellectual Property Administration in corresponding Chinese Patent Application No. 201680034897.7 and an English Translation of the Office Action. (16 pages).

* cited by examiner

METHOD AND SYSTEM FOR DYNAMIC LINKING OF OFFERS TO TRANSACTION ACCOUNTS

FIELD

The present disclosure relates to the linking of offers and transaction accounts, specifically the use of specially generated offer identifiers, such as encoded in uniform resource locators, to provide for offers for linking thereto by users associated with transaction accounts for use in payment transactions.

BACKGROUND

Merchants, product manufacturers, retailers, advertisers, content providers, and other entities often try a wide variety of methods in order to get consumers to purchase more products or purchase products from a particular merchant or location. A common method that is used is to provide a consumer with an offer, coupon, discount, deal, etc., collectively referred to herein as "offers," for a good or service. The desire is that the consumer will be motivated by the savings provided by the offer to satisfy any associated conditions and purchase the associated good or service. In an effort to improve the rate of redemption of offers, and thereby increase revenue for the associated merchants and manufacturers, offer distributors are often interested in ways to make offer acceptance and redemption more convenient to consumers.

Some such methods that have been developed include digital offers, where offer information may be stored on a mobile device and presented to a merchant at the point of sale, such as using a bar code or quick response (QR) code. Other methods include associating a payment card to an offer, such that when the payment card is used, the offer may be redeemed, sometimes automatically, by use of the associated payment card. However, current methods for associating an offer with a payment card for use in redemption thereof often include significant steps that must be performed by both the offer provider and the payment network or other entity associated with redemption of the offer. For example, an offer provider may develop an offer that is presented to a consumer and accepted. The offer provider must then collect the consumer's transaction account details, provide the account details and offer details to the payment network, and then the payment network must store the data associated with one another. Then, when the transaction is being processed, the payment network can process redemption of the offer accordingly.

Such methods can thereby be cumbersome for offer providers to develop, particularly for small businesses, such as small, local merchants, that may lack the resources necessary for development of offers, handling of sensitive financial information, and transmission thereof to payment networks, which may require specifically configured computing systems that can communicate using the payment rails and the associated communication protocols and standards. In addition, some consumers may be unwilling to provide their financial information to offer providers, and may therefore refrain from using current methods.

Thus, there is a need for a technical solution for linking transaction accounts to offers where a payment network and/or a computing system associated thereto may enable offer providers to register offers that may be presented to consumers for linking to transaction accounts. Such a system would enable offer providers to provide offers without modification to existing systems and expending resources, and would also enable consumers to link offers to their transaction account without providing financial information to the offer provider. In addition, the system itself may be improved as offer providers would not need to make modifications to existing systems or upgrade to new systems to add capabilities for new communications and protocols that are currently unused.

SUMMARY

The present disclosure provides a description of systems and methods for linking transaction accounts to offers.

A method for linking a transaction account to an offer includes: storing, in an account database, a plurality of account profiles, wherein each account profile includes data related to a transaction account including at least an account identifier; receiving, by a receiving device, offer data from an entity, wherein the offer data includes data related to an offer for the purchase of goods or services; storing, in an offer database, an offer data entry, wherein the offer data entry includes the received offer data; generating, by a processing device, an offer identifier associated with the received offer data; transmitting, by a transmitting device, the generated offer identifier to the entity; receiving, by the receiving device, an offer acceptance notification, wherein the offer acceptance notification includes at least a specific account identifier and the offer identifier; identifying, by the processing device, a specific account profile stored in the account database where the included account identifier corresponds to the specific account identifier; and updating, by the processing device, at least one of the specific account profile and the offer data entry to indicate a linkage of the related transaction account to the offer data.

A system for linking a transaction account to an offer includes an account database, a receiving device, an offer database, a processing device, and a transmitting device. The account database is configured to store a plurality of account profiles, wherein each account profile includes data related to a transaction account including at least an account identifier. The receiving device is configured to receive offer data from an entity, wherein the offer data includes data related to an offer for the purchase of goods or services. The offer database is configured to store an offer data entry, wherein the offer data entry includes the received offer data. The processing device is configured to generate an offer identifier associated with the received offer data. The transmitting device is configured to transmit the generated offer identifier to the entity. The receiving device is further configured to receive an offer acceptance notification, wherein the offer acceptance notification includes at least a specific account identifier and the offer identifier. The processing device is further configured to: identify a specific account profile stored in the account database where the included account identifier corresponds to the specific account identifier; and update at least one of the specific account profile and the offer data entry to indicate a linkage of the related transaction account to the offer data.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

System for Linking Transaction Accounts to Offers

Figure 1:
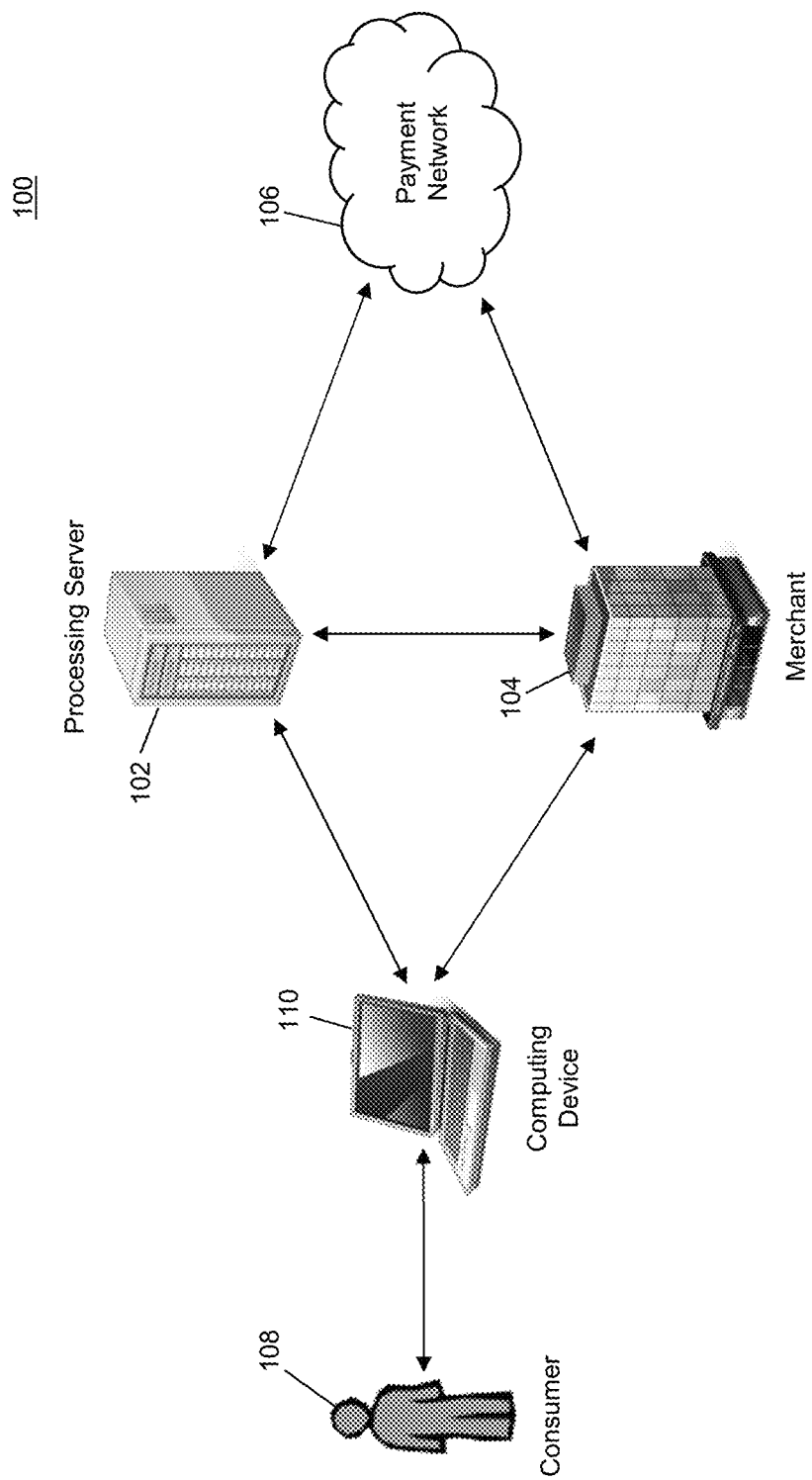
FIG. 1 is a block diagram illustrating a high level system architecture for linking transaction accounts to offers in accordance with exemplary embodiments.

FIG. 1 illustrates a system 100 for the linking of transaction accounts to offers using generated offer identifiers and submissions of transaction account data for linkage.

The system 100 may include a processing server 102. The processing server 102, discussed in more detail below, may be configured to link transaction accounts to offers using the methods and systems discussed herein. The processing server 102 may provide a platform for a merchant 104 to generate offers for the purchase of goods or services. The platform may be accessed by the merchant 104 using an application programming interface (API), via a web page, an application program executed by a computing device, interaction with an agent or user of the processing server 102, or other suitable method. The merchant 104 may provide the processing server 102 with details regarding an offer, and the processing server 102 may register the offer in a database.

The system 100 may also include a payment network 106. The payment network 106 may be configured to process payment transactions involving the merchant 104 using methods and systems that will be apparent to persons having skill in the relevant art. The processing server 102 may provide linkage information to the payment network 106, such that when the payment network 106 processes a payment transaction involving a transaction account linked to an offer, the payment network 106 may process redemption of the linked offer using known methods and systems. In some embodiments, the processing server 102 may be a part of the payment network 106. In further embodiments, the processing server 102 may be configured to perform the processing of payment transactions, including the redemption of linked offers.

When an offer is created by the merchant 104 using the platform provided by the processing server 102, the processing server 102 may generate a unique offer identifier for the offer. The offer identifier may be a unique value associated with the offer, such as an identification number, that is provided to the merchant 104. The merchant 104 may then provide the unique identifier to a consumer 108 during presentation of the offer, such as via a computing device 110, such as a smart phone, cellular phone, tablet computer, laptop computer, desktop computer, smart television, wearable computing device, etc. The consumer 108 may, if accepting of the offer, provide transaction account details directly to the processing server 102, or to the processing server 102 via the merchant 104. The processing server 102 may then link the offer to the transaction account, and provide the information to the payment network 106 for processing.

In some embodiments, the offer identifier may be a uniform resource locator (URL) or portion thereof that may be provided to the merchant 104. For example, the offer identifier may be a unique URL or may be a unique value (e.g., a string of hexadecimal characters) included as part of a URL that is provided to the merchant 104 associated with a created offer. The merchant 104 may then provide a hyperlink to the URL to the consumer 108, such as via the computing device 110, in order to present the offer. In some embodiments, the hyperlink may be to a webpage for the consumer 108 to enter their transaction account information (e.g., directly to the processing server 102 or via the merchant 104) to link the offer. In other embodiments, the hyperlink may direct the computing device 110 to a first webpage to view the offer, and then a second webpage to enter transaction account information. In additional embodiments, the hyperlink may direct the computing device 110 to a webpage that includes both offer details and entry of transaction account information.

In one embodiment, the consumer 108 may be presented with offer details and a form for submitting transaction account information prior to accessing a hyperlink. In such an embodiment, the form may be submitted directly to the processing server 102 using the uniquely generated URL. When transaction account information is received by the processing server 102, the processing server 102 may use the offer identifier to identify the offer to be associated with the transaction account and may link the transaction account to the offer accordingly.

In some embodiments, the webpages used to present the offer and/or collect transaction account information may be hosted by or otherwise associated with the merchant 104. In other embodiments, the webpages may be hosted by or otherwise associated with the processing server 102. In more embodiments, the webpages may be hosted by or otherwise associated with a combination of the processing server 102 and merchant 104, such as a merchant 104 webpage displaying offer details and a hyperlink to the URL provided by the processing server 102, which may direct the computing device 110 to a webpage from the processing server 102 for the entry of transaction account information. By enabling the consumer 108 to provide transaction account information to the processing server 102 (e.g., and, in instances where the payment network 106 includes the processing server 102, directly to their trusted payment network 106), consumers 108 may have a higher sense of security and may therefore be more willing to provide their account information and therefore more likely to accept, and redeem, offers.

In addition, the use of the processing server 102 to provide a platform for creation of offers and linkage thereto to transaction accounts may enable merchants 104 to create and distribute offers to consumers 108 without modifying existing hardware systems, adding new hardware systems, providing additional training to employees, upgrading existing software, and other activities that may cost the merchant 104 both time and resources. In addition, the merchant 104 may be saved from adding new, specially configured computing systems that can handle transaction account information and communications with the payment network 106 outside of traditional payment transaction messages. As a result, the methods and systems discussed herein may enable the processing server 102 to provide for linkage of transaction accounts to offers that are more convenient to merchants 104, more trustworthy to consumers 108, and more efficient than existing systems.

Processing Server

Figure 2:
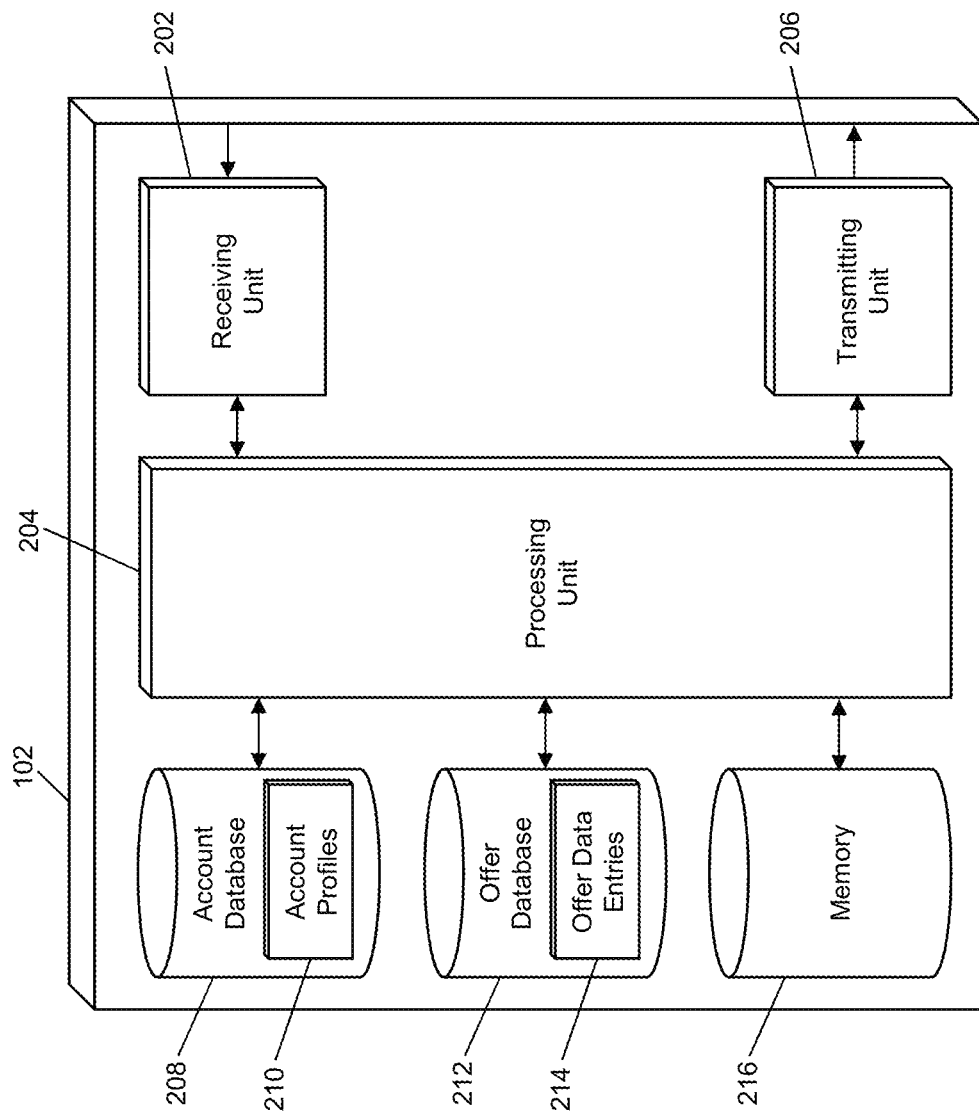
FIG. 2 is a block diagram illustrating the processing server of FIG. 1 for linking transaction accounts to offers in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive offer data from a merchant 104 or other offer provider that may include details for an offer to be distributed by the respective entity. The receiving unit 202 may also be configured to receive transaction account details from a computing device 110, merchant 104, payment network 106, financial institution, or other suitable entity. For example, the consumer 108 may submit transaction account details for linkage to an offer via the computing device 110, the merchant 104 may provide transaction account details for linkage, payment networks 106 and/or financial institutions may provide transaction account details for use in performing linkages, etc.

The processing server 102 may also include an account database 208. The account database 208 may be configured to store a plurality of account profiles 210. Each account profile 210 may be configured to store data related to a transaction account including at least an account identifier. The account identifier may be a unique value associated with the account profile 210 and/or related transaction account for use in identification thereof, such as an identification number, account number, username, e-mail address, phone number, etc.

The processing server 102 may also include an offer database 212. The offer database 212 may be configured to store a plurality of offer data entries 214. Each offer data entry 214 may be related to an offer and include at least an offer identifier and offer data. The offer identifier may be, as discussed above, a unique value suitable for use in identification of the related offer and/or the respective offer data entry 214. The offer data may include any data associated with the related offer, such as a name, description, image, amount modifier, type, start date, expiration date, quantity, value, limitation on redemption, etc.

The processing server 102 may further include a processing unit 204. The processing unit 204 may be configured to perform the functions of the processing server 102 discussed herein as will be apparent to persons having skill in the relevant art. The processing unit 204 may be configured to generate offer data entries 214 for storage in the offer database 212 for offer data received by the receiving unit 202, including the generating and/or identification of offer identifiers. Offer identifiers may be randomly generated and/or identified, may be based on one or more pieces of offer data, sequentially identified, or identified using any other suitable method.

The processing server 102 may also be configured to link account profiles 210 with offer data entries 214 based on transaction account information and offer data received by the receiving unit 202. In one embodiment, offer identifiers for linked offers may be stored in an account profile 210, for linkage of the related transaction account to the offer related to the corresponding offer data entry 214. In other embodiments, account identifiers may be stored in an offer data entry 214 corresponding transaction accounts linked to the related offer. In some embodiments, the processing server 102 may include an additional database or storage (e.g., such as a memory 216) for the storage of linkage data, such as including linkage pairs of account identifiers and offer identifiers.

In some instances, the processing unit 204 may generate a unique offer identifier for each distribution of an offer by the merchant 104. In such embodiments, the merchant 104 may provide the unique offer identifier to a consumer 108 whose transaction account information is known (e.g., by having a prior account with the merchant 104 and/or processing server 102, etc.). The consumer 108 may indicate acceptance of the offer, and the processing unit 204 may link the corresponding account profile 210 and offer data entry 214 upon receipt of the offer identifier by the receiving unit 202.

The processing server 102 may also include a transmitting unit 206. The transmitting unit 206 may be configured to transmit data over one or more networks via one or more network protocols. The transmitting unit 206 may transmit offer data to the computing device 110 or merchant 104, such as identified upon receipt of an offer data request by the receiving unit 202 including an offer identifier. The transmitting unit 206 may also be configured to transmit offer identifiers, such as in response to offer data received by the receiving unit 202 for the generation of an offer. The transmitting unit 206 may further be configured to transmit transaction account information and offer data to a payment network 106 for use in processing redemption of offers linked to transaction accounts.

The processing server 102 may also include a memory 216. The memory 216 may be configured to store data suitable for performing the functions of the processing server 102 discussed herein. For example, the memory 216 may be configured to store rules and/or algorithms for generating offer identifiers and/or URLs, unused offer identifiers, algorithms for encryption of transaction account information, rules for communicating using specialized communication protocols, etc. Additional data that may be stored in the memory 216 will be apparent to persons having skill in the relevant art.

It will be further apparent to persons having skill in the relevant art that the processing server 102 may include additional components and/or that the components included in the processing server 102 as illustrated in FIG. 2 and discussed herein may be further configured to perform additional functions. For example, in embodiments where the processing server 102 is a part of the payment network 106, the components of the processing server 102 may be configured to perform additional functions for the processing of payment transactions, such as the receipt and transmission of authorization requests, the application of fraud rules, etc.

Process for Distributing Offer Data for Transaction Account Linkage

Figure 3:
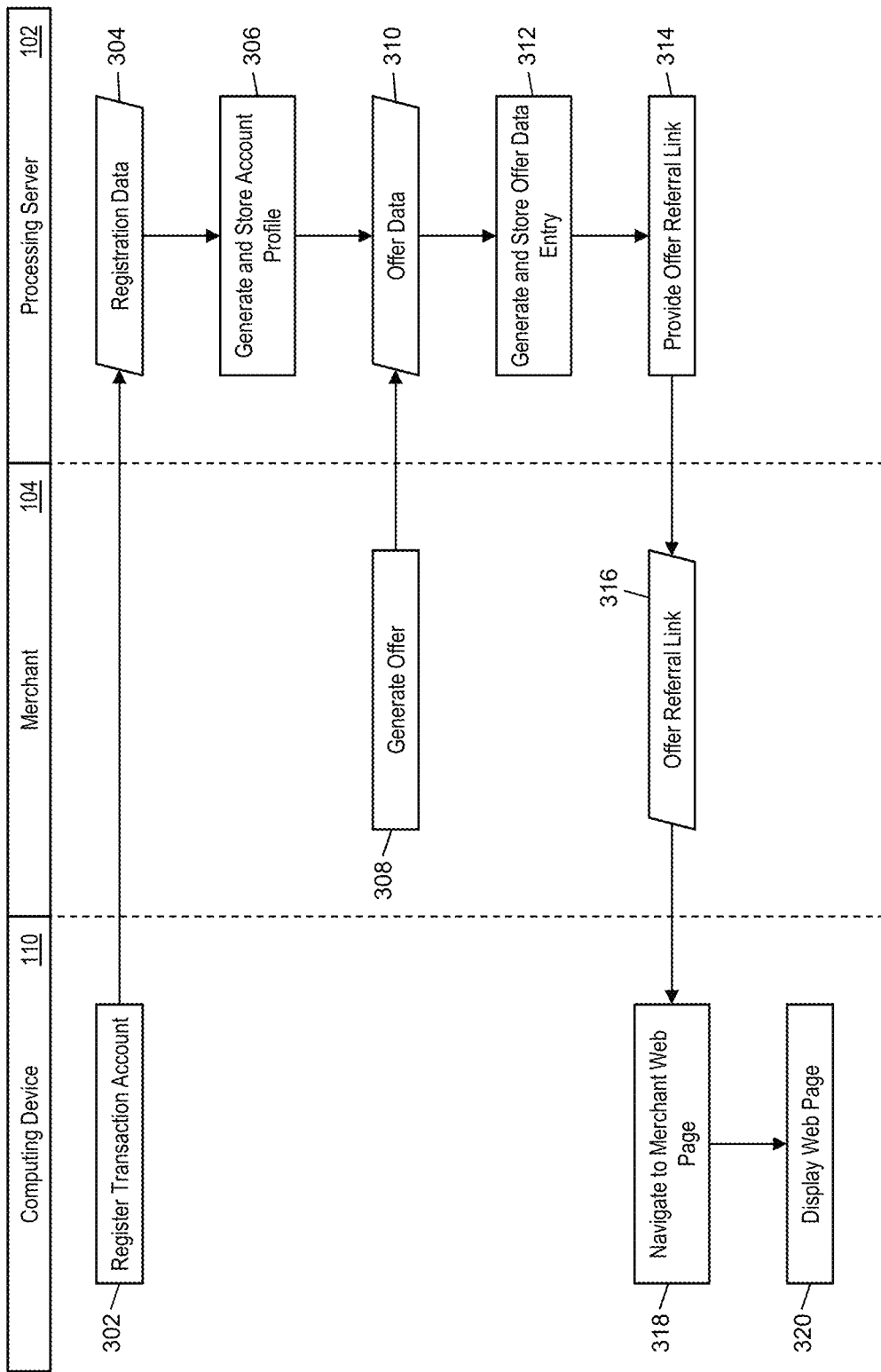
FIG. 3 is a flow diagram illustrating a process for viewing a registered offer for linkage with a transaction account in accordance with exemplary embodiments.

FIG. 3 illustrates a process for creation of an offer with the processing server 102 and distributing offer data to a computing device 110 for review by a consumer 108 for linkage with a transaction account using the system 100.

In step 302, the consumer 108 may register their transaction account with the processing server 102 using the computing device 110. Registration may include submitting their account identifier and any other account information (e.g., for authentication of the consumer 108 as an authorized user of the transaction account) to the processing server 102, such as via a website, application program, etc. In step 304, the receiving unit 202 of the processing server 102 may receive the registration data. In step 306, the processing unit 204 of the processing server 102 may generate an account profile 210 for the transaction account including the supplied account identifier and store it in the account database 208. In some embodiments, step 306 may include validating or otherwise authenticating the information provided by the consumer 108, using methods and systems that will be apparent to persons having skill in the relevant art. In some instances, steps 302 through 306 may take place during acceptance of an offer, such as if the consumer 108 accepts an offer provided by a merchant 104 prior to registration of an account.

In step 308, the merchant 104 may generate an offer for the purchase of goods or services. Generation of the offer may include submitting offer details to the processing server 102 via an application program, website, or other method of interface with the offer platform provided by the processing server 102. In step 310, the receiving unit 202 may receive the offer data, which may include, for example, an offer name, offer description, transaction modifier, expiration data, offer quantity, etc. In step 312, the processing unit 204 of the processing server 102 may generate an offer data entry 214 for the offer and store it in the offer database 212. Generation of the offer data entry 214 may include the generation or identification of an offer identifier unique to the generated offer.

In step 314, the processing unit 204 of the processing server 102 may generate a URL that includes the offer identifier associated with the generated offer, and the transmitting unit 206 of the processing server 102 may transmit the URL to the merchant 104. In step 316, the merchant 104 may receive the URL, which may be included in a webpage hosted by or on behalf of the merchant 104. In step 318, the computing device 110 may navigate to the merchant webpage that includes the referral link, and, in step 320, may display the webpage to the consumer 108 using known methods and systems.

First Process for Linking a Transaction Account to an Offer

Figure 4:
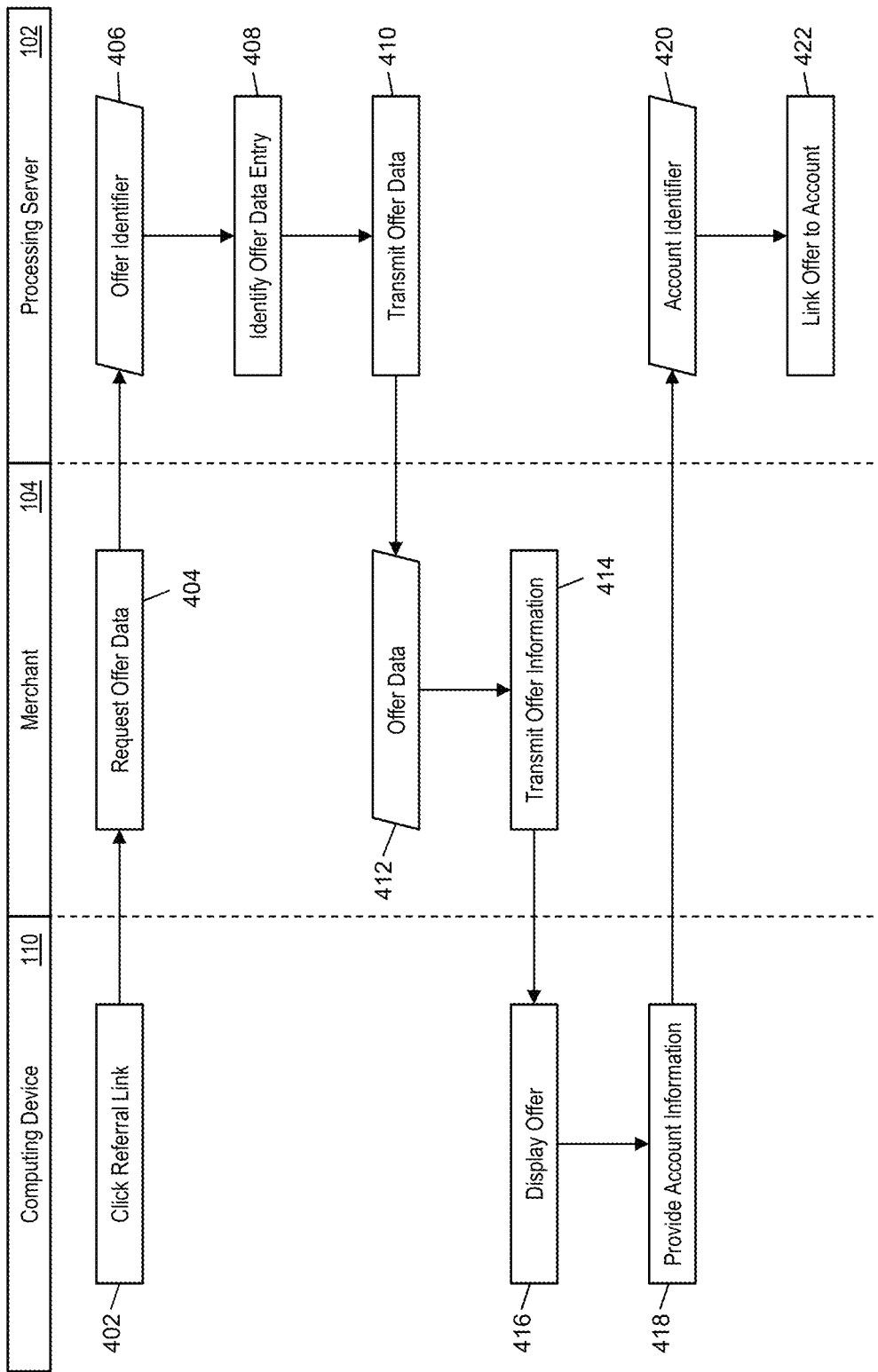
FIG. 4 is a flow diagram illustrating a process for linking an offer with a transaction account including merchant participation in accordance with exemplary embodiments.

FIG. 4 illustrates a first illustrative process for the linking of a transaction account to an offer using the system 100 that includes the merchant 104.

In step 402, the consumer 108 may interact with the referral link that includes the unique identifier on the merchant webpage using the computing device 110. In step 404, the interaction with the referral link may instruct the merchant 104 to submit an offer data request to the processing server 102. In step 406, the receiving unit 202 of the processing server 102 may receive the offer data request in the form of the offer identifier included in the referral link interacted with by the consumer 108. In step 408, the processing unit 204 of the processing server 102 may identify an offer data entry 214 stored in the offer database 212 that includes the offer identifier.

In step 410, the transmitting unit 206 of the processing server 102 may transmit offer data included in the identified offer data entry 214 back to the merchant 104. In some embodiments, the offer data request provided by the merchant 104 in step 404 may include one or more requested data fields. In such embodiments, the offer data transmitted to the merchant 104 may include offer data corresponding to the requested data fields. In step 412, the merchant 104 may receive the offer data from the processing server 102.

In step 414, the merchant 104 may transmit the offer information to the computing device 110 via a webpage navigated to by the computing device 110 as a result of interaction with the referral link. For instance, the referral link may navigate the computing device 110 to an offer page where offer data is displayed that corresponds to the offer identifier included in the URL, such as using a GET or POST form action. In step 416, the computing device 110 may display the offer data to the consumer 108. In step 418, the consumer 108 may accept the offer and initiate linkage of the offer to their transaction account by submitting account information to the processing server 102. In instances where the consumer 108 may not have registered their transaction account for linkage, and if registration is required, step 418 may also include the submission of registration information.

In step 420, the receiving unit 202 of the processing server 102 may receive at least the account identifier associated with the transaction account that the consumer 108 wishes to link to the offer. In some instances, the receiving unit 202 may also receive authentication information, which may be used by the processing unit 204 to authenticate the consumer 108 prior to acceptance and/or use of the provided account identifier. In step 422, the processing unit 204 of the processing server 102 may link the offer to the transaction account, such as by identifying an account profile 210 that includes the account identifier and including the offer identifier for the linked offer in the account profile 210, and/or transmitting account and offer data to the payment network 106.

Second Process for Linking a Transaction Account to an Offer

Figure 5:
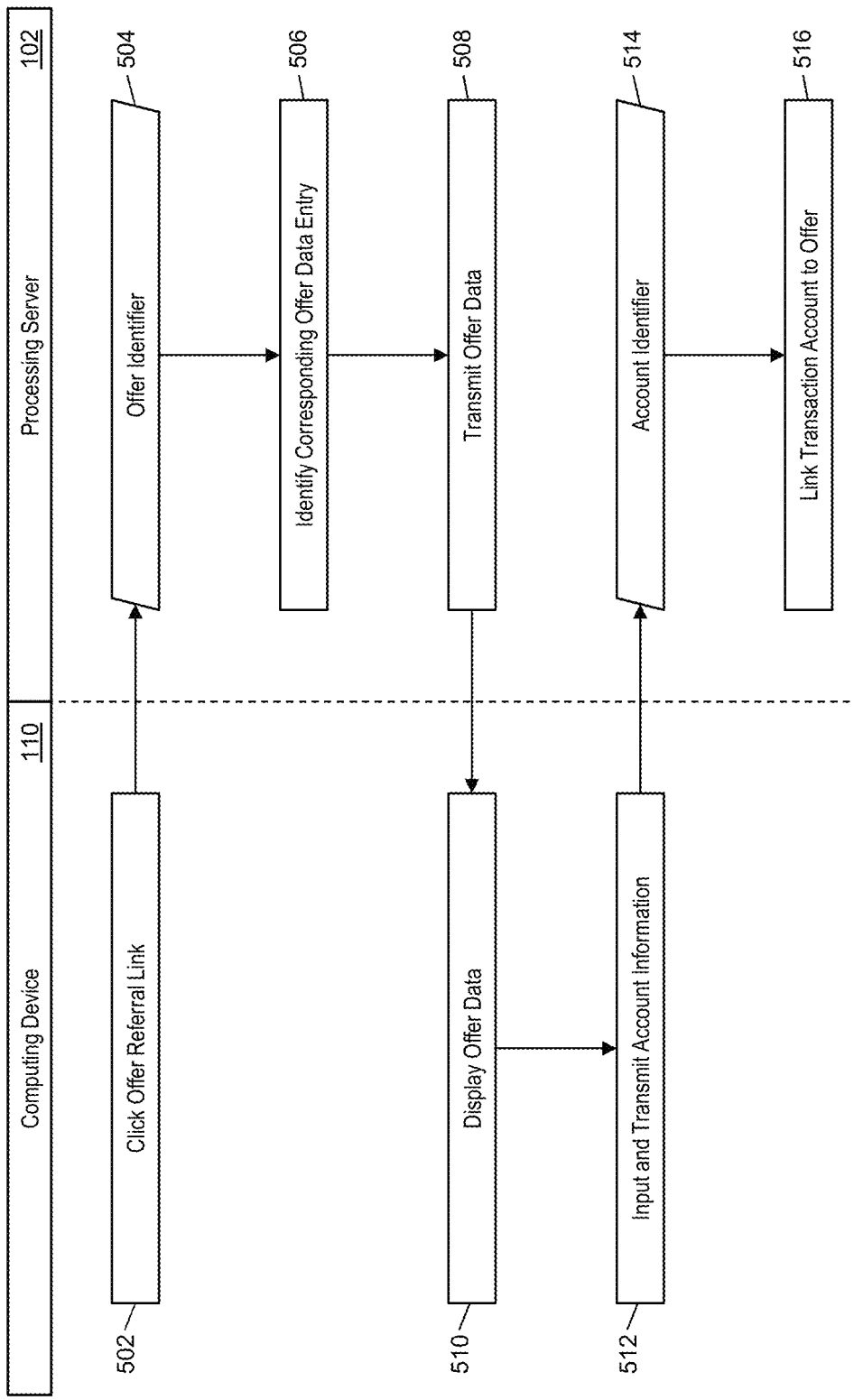
FIG. 5 is a flow diagram illustrating a process for direct linkage of an offer with a transaction account in accordance with exemplary embodiments.

FIG. 5 illustrates a second illustrative process for the linking of a transaction account to an offer where the merchant 104 is not involved in the display of offer data and collection of transaction account information.

In step 502, the consumer 108 may click on the offer referral link that includes the account identifier displayed on the merchant webpage using the computing device 110. Interaction with the referral link may cause the offer identifier to be transmitted to the processing server 102, and received by the receiving unit 202 in step 504. In step 506, the processing unit 204 of the processing server 102 may identify an offer data entry 214 in the offer database 212 that includes the offer identifier. In step 508, the transmitting unit 206 of the processing server 102 may transmit offer data included in the identified offer data entry 214 to the computing device 110, such as in a newly displayed webpage navigated to by the computing device 110 as a result of interaction with the offer referral link.

In step 510, the offer data may be displayed to the consumer 108 by the computing device 110 at the newly-navigated to webpage. The new webpage that displays the offer data may be hosted by, or on behalf of, the processing server 102. The offer webpage may include a form including data fields for the submission of account information by the consumer 108. In step 512, the consumer 108 may input their transaction account information, such as the account identifier and any necessary authentication information, such as a username, password, card selection, etc., and submit the information to the processing server 102.

In step 514, the receiving unit 202 of the processing server 102 may receive the account information. In some embodiments, the account identifier received by the receiving unit 202 may be a transaction account number. In other embodiments, the account identifier may be a username associated with an account profile 210 that includes a transaction account number or other information that may be suitable for use by the payment network 106 in identifying a transaction account. In some instances, the account identifier may be accompanied by an additional value used to identify a specific transaction account, such as in instances where the consumer 108 may have several transaction accounts and may select a specific one for linkage with the offer. For example, the account identifier may be a username that corresponds to an account profile 210, which may include several additional values that are each associated with a specific transaction account. In step 516, the processing unit 204 may link the indicated transaction account to the offer.

Process for Linking a Transaction Account to an Offer

Figure 6:
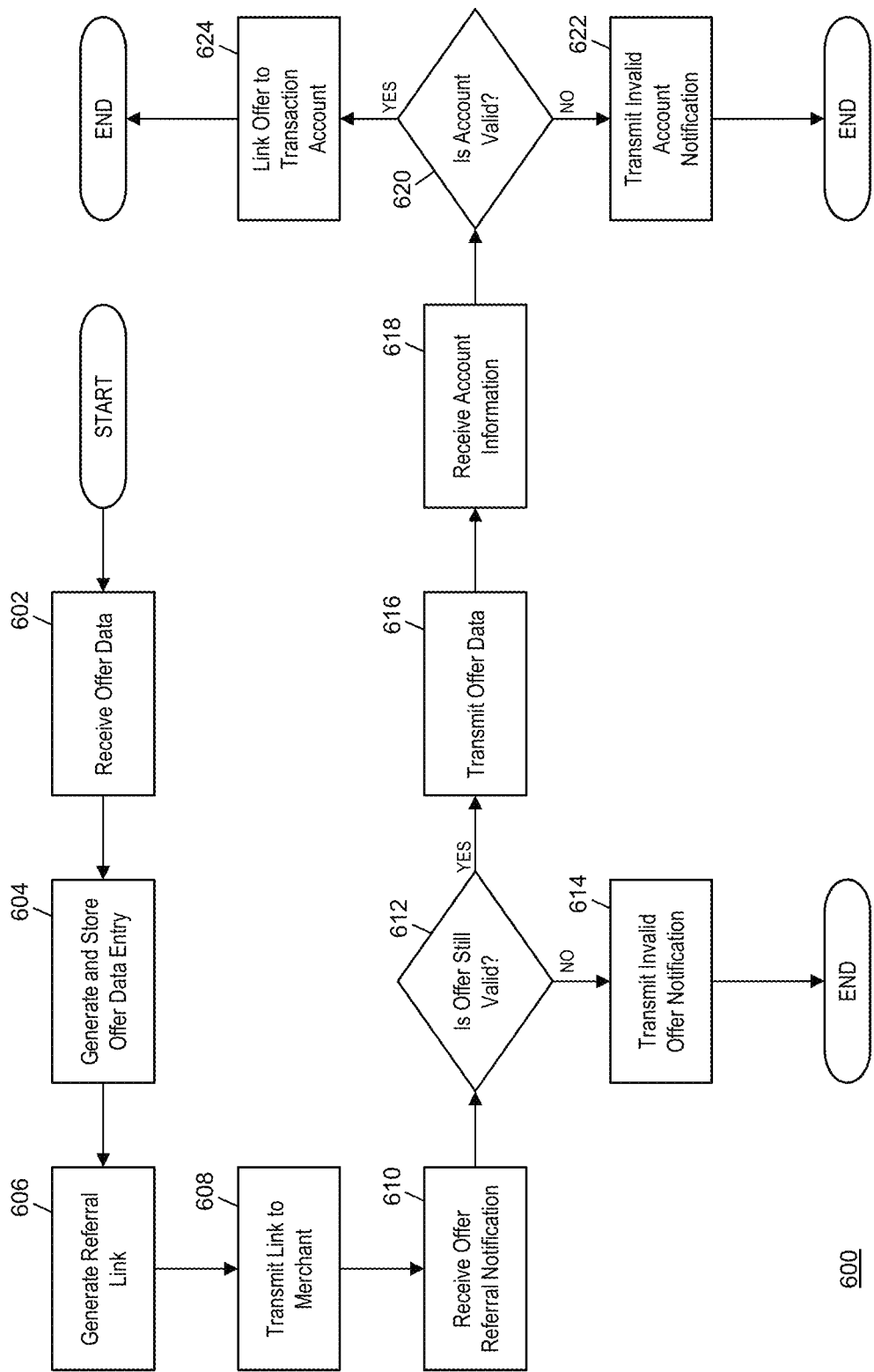
FIG. 6 is a flow diagram illustrating a process for linking an offer with a transaction account using the processing server of FIG. 2 in accordance with exemplary embodiments.

FIG. 6 illustrates a process 600 for the linking of a transaction account to an offer using the processing server 102.

In step 602, the receiving unit 202 of the processing server 102 may receive offer data for an offer generated by a merchant 104 or other suitable entity, such as by using a platform provided by the processing server 102. The offer data may include an offer name, description, image, start date, expiration date, transaction modifier, type, category, industry, quantity, limitation on redemption, etc. In step 604, the processing unit 204 of the processing server 102 may generate an offer data entry 214 that includes the offer data and store it in the offer database 212 of the processing server 102. The generation of the offer data entry 214 may also include generating and/or identifying an offer identifier to be associated with the offer.

In step 606, the processing unit 204 may generate a URL that includes the offer identifier. The URL may direct a computing device, such as the computing device 110, to a webpage hosted by or on behalf of the processing server 102, the merchant 104 that submitted the offer, or any other suitable entity, and may include the offer identifier for submission to the processing server 102 or suitable entity upon interaction with the URL and/or navigation to the indicated webpage. In step 608, the transmitting unit 206 of the processing server 102 may transmit the generated referral link to the merchant 104 that submitted the offer.

In step 610, the receiving unit 202 may receive an offer referral notification. The offer referral notification may be a notification received by the receiving unit 202 that includes the offer identifier, which may be received as a result of a consumer 108 interacting with the referral link. In step 612, the processing unit 204 may determine if the associated offer is still valid. The determination may be made by identifying an offer data entry 214 that includes the offer identifier, and then determining if any invalidating criteria have been met, such as if an expiration date has passed, an available quantity has expired, etc. If the offer is no longer valid, then, in step 614, the transmitting unit 206 may transmit a notification to the consumer 108 (e.g., via the webpage navigated to by the computing device 110 upon interacting with the offer referral link) indicating that the offer is no longer available.

If the offer is still valid, then, in step 616, the transmitting unit 206 may transmit offer data included in the associated offer data entry 214 to the computing device 110 for display to the consumer 108. In step 618, the receiving unit 202 may receive transaction account information identifying a transaction account for linkage with the offer. In embodiments where the transaction account may not be registered for linkage, and if registration is necessary, the account information may include any additional registration information. In step 620, the processing unit 204 may determine if the indicated transaction account is valid for linkage with the offer. The validity may be based on identifying if an account profile 210 stored in the account database 208 includes the account identifier, and, if so, if the related transaction account can be linked with offers. For example, an issuer of the transaction account may have rules prohibiting the account from being linked with offers, such as due to an insufficient balance, unpaid fees, account type, etc.

If the transaction account is determined to be invalid, then, in step 622, the transmitting unit 206 may transmit a notification to the computing device 110 for display to the consumer 108 indicating that the transaction account is invalid and that the offer cannot be linked. If the transaction account is determined to be valid, then, in step 624, the processing unit 204 may link the offer to the transaction account. In some instances, the transmitting unit 206 may also transmit a notification to the computing device 110 for display to the consumer 108 indicating that the offer has been linked to their transaction account and is ready for redemption.

Graphical User Interface

Figure 7:
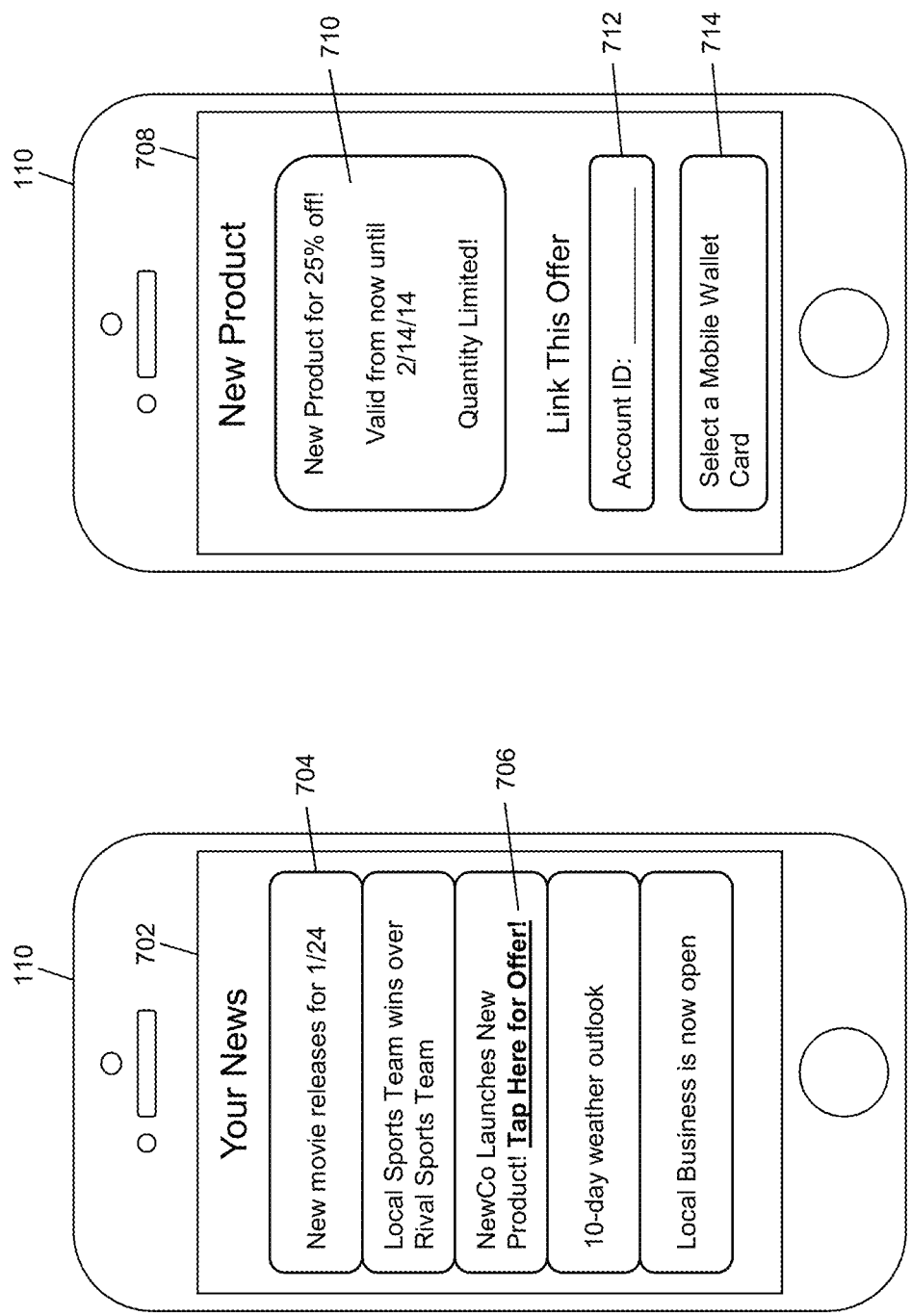
FIGS. 7A and 7B are diagrams illustrating an exemplary graphical user interface for linking a transaction account with an offer in accordance with exemplary embodiments.

FIGS. 7A and 7B illustrate an exemplary graphical user interface of a computing device 110 for the display of offers and the input of account information of linkage of a displayed offer to a transaction account. It will be apparent to persons having skill in the relevant art that the interfaces illustrated in FIGS. 7A and 7B and discussed herein are provided as an illustration only, and that additional interfaces and configurations may be utilized in performing the methods and systems discussed herein.

FIG. 7A illustrates a display 702 of the computing device 110. The display 702 may include a plurality of news items 704. Each of the news items 704 may include information for display to the consumer 108, and may be interacted with to display an associated story to the consumer 108. The display 102 also includes an offer referral link 706. The offer referral link 706 may be displayed to the consumer 108 in a news item 704 and may indicate that there is an offer available to the consumer 108 to link to their transaction account. The offer referral link 706 may be a hyperlink to a URL that includes an offer identifier associated with the offer.

When the consumer 108 interacts with the offer referral link 706, the computing device 110 may navigate a web browsing application program to a new display 708, which may display an offer page. The offer page may include offer data 710, which may correspond to offer data included in an offer data entry 214 in the offer database 212 that includes the offer identifier included in the URL of the offer referral link 706. The offer page may also include an account identifier input 712 and a mobile wallet selection 714.

The account identifier input 712 may be an input field in which the consumer 108 can input an account identifier to be used by the processing server 102 for linkage of the offer corresponding to the displayed offer data 710 to the associated transaction account. The account identifier that may be input may be an account number, username, e-mail address, or any other suitable type of identifier that may be associated with one or more transaction accounts. The mobile wallet selection 714 may enable the consumer 108 to select a transaction account using a mobile wallet stored on the computing device 110. The consumer 108 may select a transaction account using the mobile wallet, and the mobile wallet may transmit account details to the processing server 102, using methods and systems that will be apparent to persons having skill in the relevant art. The processing server 102 may then link the transaction account to the offer.

Exemplary Method for Linking a Transaction Account to an Offer

Figure 8:
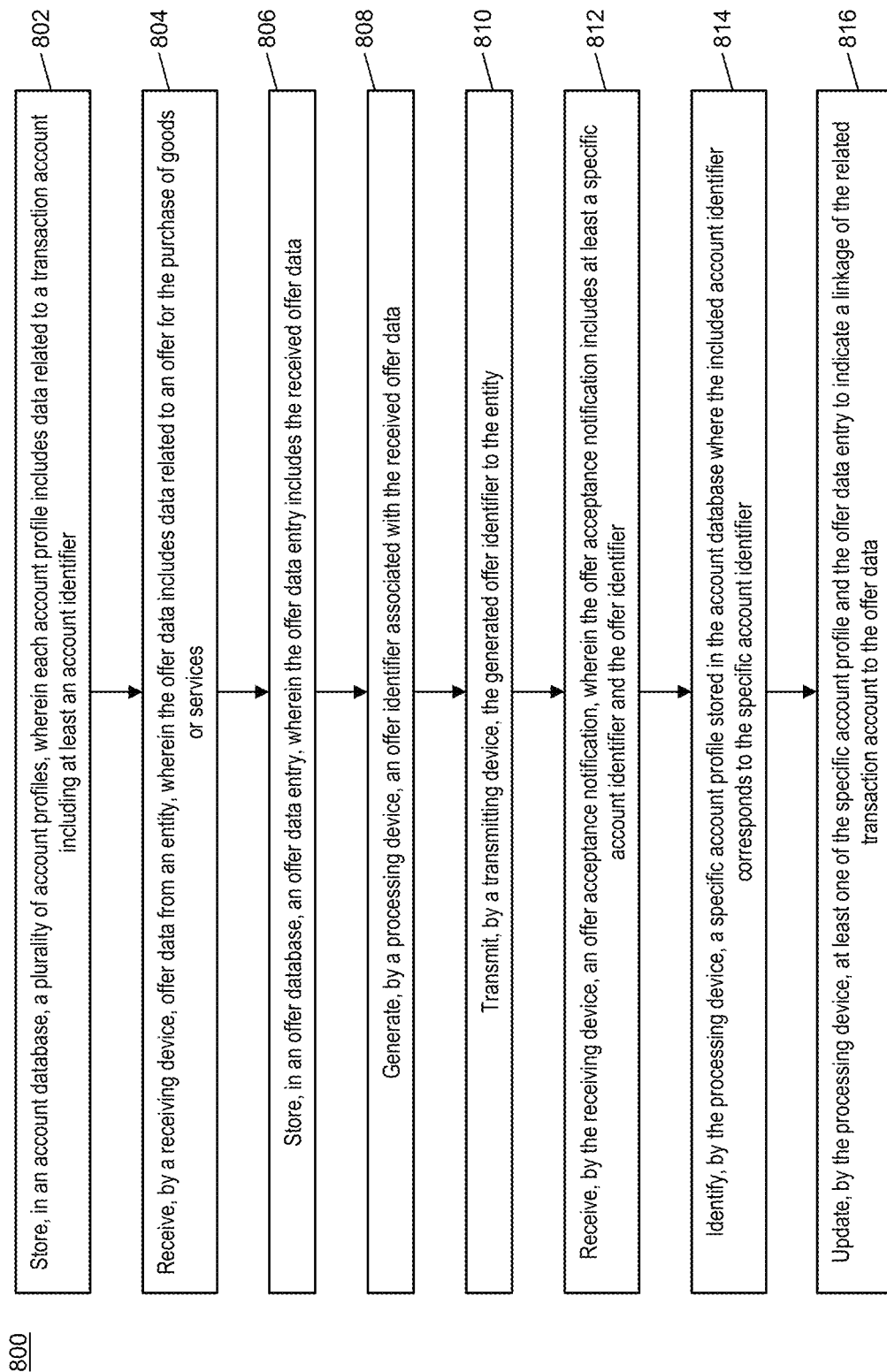
FIG. 8 is a flow chart illustrating an exemplary method for linking a transaction account to an offer in accordance with exemplary embodiments.

FIG. 8 illustrates a method 800 for the linkage of a transaction account to an offer.

In step 802, a plurality of account profiles (e.g., account profiles 210) may be stored in an account database (e.g., account database 208), wherein each account profile 210 includes data related to a transaction account including at least an account identifier. In one embodiment, the account identifier may be one of: a transaction account number, a username, an e-mail address, and a phone number. In step 804, offer data may be received by a receiving device (e.g., the receiving unit 202) from an entity, wherein the offer data includes data related to an offer for the purchase of goods or services.

In step 806, an offer data entry (e.g., offer data entry 214) may be stored in an offer database (e.g., the offer database 212), wherein the offer data entry includes the received offer data. In step 808, an offer identifier associated with the received offer data may be generated by a processing device (e.g., the processing unit 204). In one embodiment, the offer data may include at least one of: an offer name, offer description, quantity, expiration date, start date, transaction modifier, and one or more terms on redemption.

In step 810, the generated offer identifier may be transmitted, by a transmitting device (e.g., the transmitting unit 206), to the entity. In one embodiment, generating the offer identifier may include generating a uniform resource locator (URL) including at least the offer identifier, and transmitting the generated offer identifier may include transmitting the generated URL including the offer identifier. In step 812, an offer acceptance notification may be received by the receiving device (e.g., the receiving unit 202), wherein the offer acceptance notification includes at least a specific account identifier and the offer identifier. In one embodiment, the offer acceptance notification may be a URL that includes the offer identifier and the specific account identifier.

In step 814, a specific account profile 210 stored in the account database 208 may be identified by the processing device 204 where the included account identifier corresponds to the specific account identifier. In step 816, at least one of the specific account profile 210 and the offer data entry 214 may be updated by the processing device 204 to indicate a linkage of the related transaction account to the offer data. In some embodiments, updating the specific account profile 210 to indicate a linkage may include storing the offer identifier in the specific account profile. In other embodiments, updating the offer data entry 214 to indicate a linkage may include storing the specific account identifier in the offer data entry 214.

In one embodiment, the method 800 may further include: receiving, by the receiving device 202, an offer request, wherein the offer request includes at least the offer identifier; and transmitting, by the transmitting device 206, the offer data included in the offer data entry 214 in response to the received offer request. In a further embodiment, the offer request may be received and the offer data may be transmitted prior to receiving the offer acceptance notification. In another further embodiment, the offer request may be a URL that includes the offer identifier.

Computer System Architecture

Figure 9:
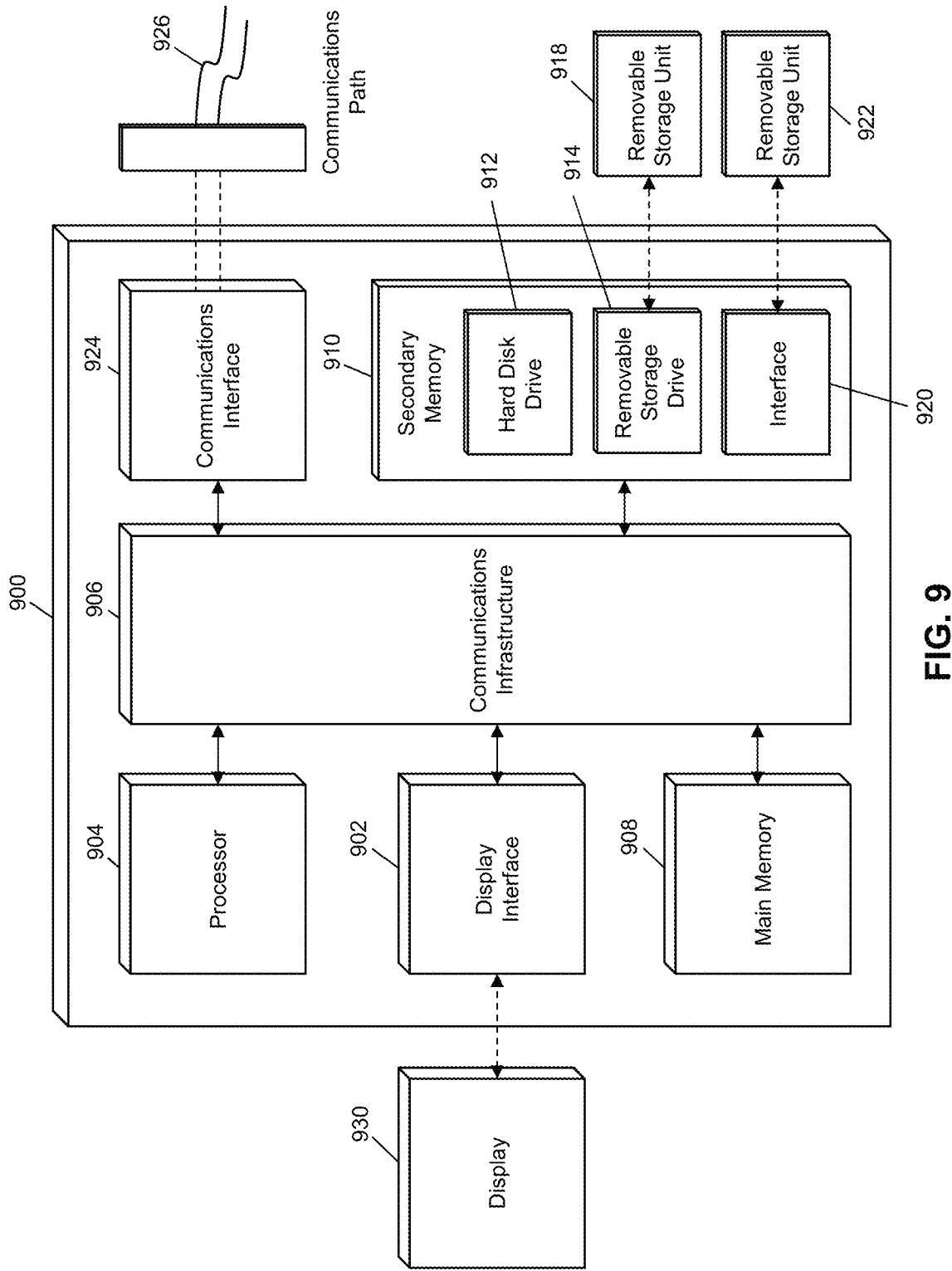
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the processing server 102 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6 and 8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-6 and 8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

Techniques consistent with the present disclosure provide, among other features, systems and methods for linking transaction accounts to offers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for linking a transaction account to an offer, comprising:
    storing, in an account database of a processing server, a plurality of account profiles, wherein each account profile includes at least an account identifier;
    receiving, by a receiving device of the processing server, offer data from a merchant who generates an offer for the purchase of goods or services, wherein the offer data includes data related to the offer for the purchase of goods or services;

storing, in an offer database of the processing server, an offer data entry including the received offer data;

generating, by a processing device of the processing server, a uniform resource locator (URL) including at least an offer identifier associated with the received offer data, wherein the offer identifier is a string of hexadecimal characters included as part of the URL;

transmitting, by a transmitting device of the processing server, the generated URL including the offer identifier to the merchant;

receiving, by the receiving device of the processing server, an offer acceptance notification including at least a specific account identifier and the offer identifier;

identifying, by the processing device of the processing server, a specific account profile stored in the account database where the account identifier included in the specific account profile corresponds to the specific account identifier included in the received offer acceptance notification; and updating, by the processing device of the processing server, at least one of the specific account profile and the offer data entry to indicate a linkage of the related transaction account to the offer data.

2. The method of claim 1, further comprising:
receiving, by the receiving device, an offer request including at least the offer identifier; and
transmitting, by the transmitting device, the offer data included in the offer data entry in response to the received offer request.

3. The method of claim 2, wherein the offer request is received and the offer data is transmitted prior to receiving the offer acceptance notification.

4. The method of claim 2, wherein the offer request is a uniform resource locator that includes the offer identifier.

5. The method of claim 1, wherein the offer acceptance notification is a uniform resource locator that includes the offer identifier and the specific account identifier.

6. The method of claim 1, wherein the offer data includes at least one of: an offer name, offer description, quantity, expiration date, start date, transaction modifier, and one or more terms on redemption.

7. The method of claim 1, wherein the account identifier is one of: a transaction account number, a username, an e-mail address, and a phone number.

8. The method of claim 1, wherein updating the specific account profile to indicate a linkage of the related transaction account to the offer data includes storing the offer identifier in the specific account profile.

9. The method of claim 1, wherein updating the offer data entry to indicate a linkage of the related transaction account to the offer data includes storing the specific account identifier in the offer data entry.

10. A system for linking a transaction account to an offer, comprising:
an account database, of a processing server, configured to store a plurality of account profiles, wherein each account profile includes at least an account identifier;

a receiving device, of the processing server, configured to receive offer data from a merchant who generates an offer for the purchase of goods and services, wherein the offer data includes data related to the offer for the purchase of goods or services;

an offer database, of the processing server, configured to store an offer data entry including the received offer data;

a processing device, of the processing server, configured to generate a uniform resource locator (URL) including at least an offer identifier associated with the received offer data, wherein the offer identifier is a string of hexadecimal characters included as part of the URL;

a transmitting device, of the processing server, configured to transmit the generated URL including the offer identifier to the merchant, wherein the receiving device is further configured to receive an offer acceptance notification, wherein the offer acceptance notification includes at least a specific account identifier and the offer identifier; and the processing device is further configured to
identify a specific account profile stored in the account database where the account identifier included in the specific account profile corresponds to the specific account identifier included in the received offer acceptance notification, and
update at least one of the specific account profile and the offer data entry to indicate a linkage of the related transaction account to the offer data.

11. The system of claim 10, wherein
the receiving device is further configured to receive an offer request including at least the offer identifier, and
the transmitting device is further configured to transmit the offer data included in the offer data entry in response to the received offer request.

12. The system of claim 11, wherein the offer request is received and the offer data is transmitted prior to receiving the offer acceptance notification.

13. The system of claim 11, wherein the offer request is a uniform resource locator that includes the offer identifier.

14. The system of claim 10, wherein the offer acceptance notification is a uniform resource locator that includes the offer identifier and the specific account identifier.

15. The system of claim 10, wherein the offer data includes at least one of: an offer name, offer description, quantity, expiration date, start date, transaction modifier, and one or more terms on redemption.

16. The system of claim 10, wherein the account identifier is one of: a transaction account number, a username, an e-mail address, and a phone number.

17. The system of claim 10, wherein updating the specific account profile to indicate a linkage of the related transaction account to the offer data includes storing the offer identifier in the specific account profile.

18. The system of claim 10, wherein updating the offer data entry to indicate a linkage of the related transaction account to the offer data includes storing the specific account identifier in the offer data entry.

* * * * *